Oct. 10, 1944.  W. F. MOORE  2,359,869
THREAD GAUGE
Filed Oct. 6, 1942   4 Sheets-Sheet 1
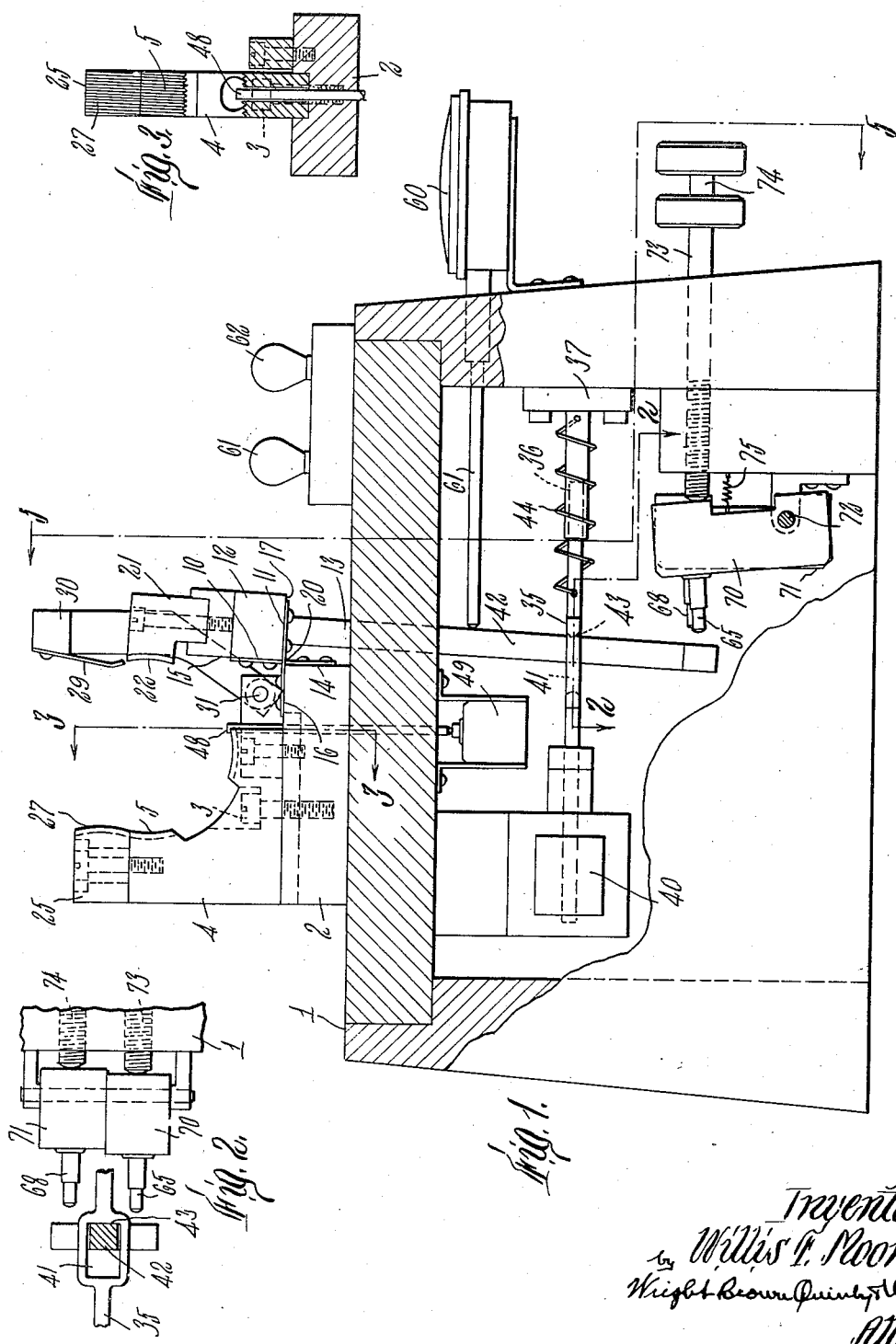

Oct. 10, 1944.  W. F. MOORE  2,359,869
THREAD GAUGE
Filed Oct. 6, 1942  4 Sheets-Sheet 2
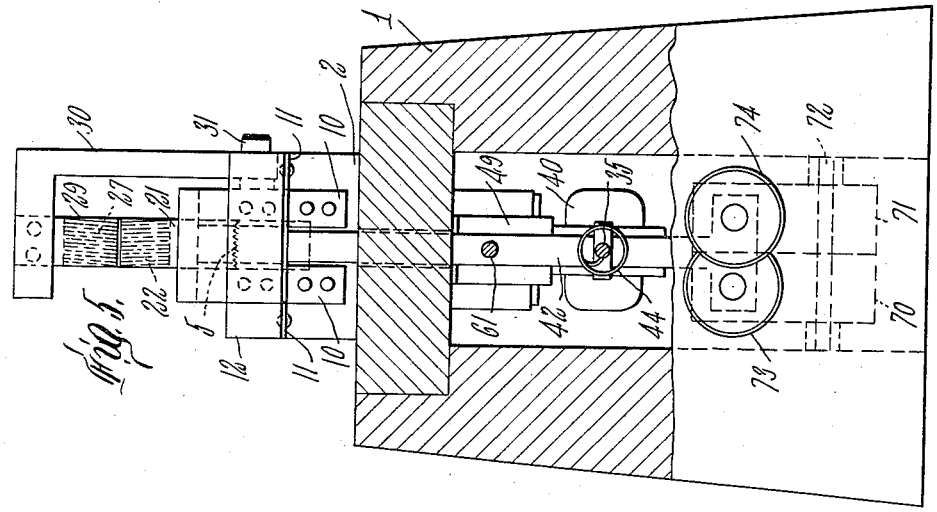
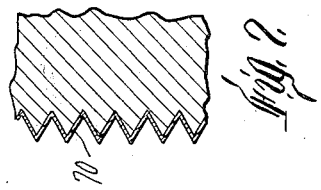
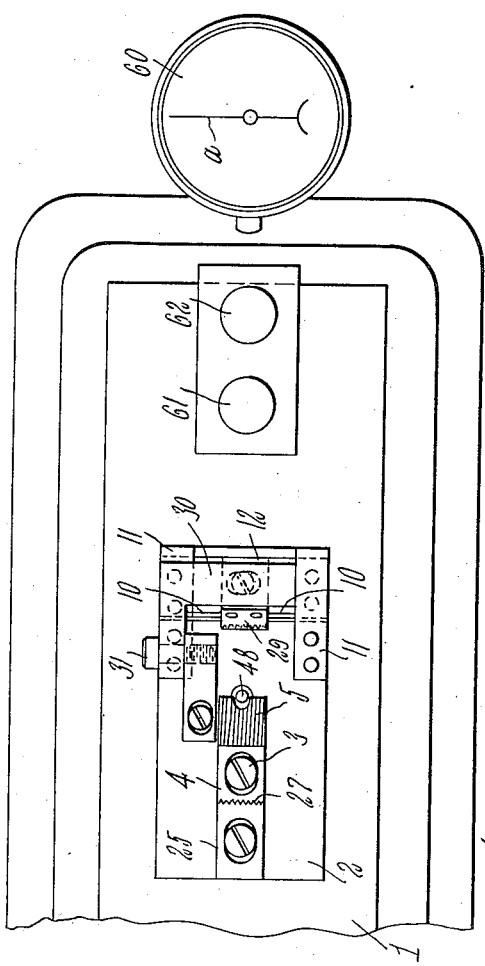
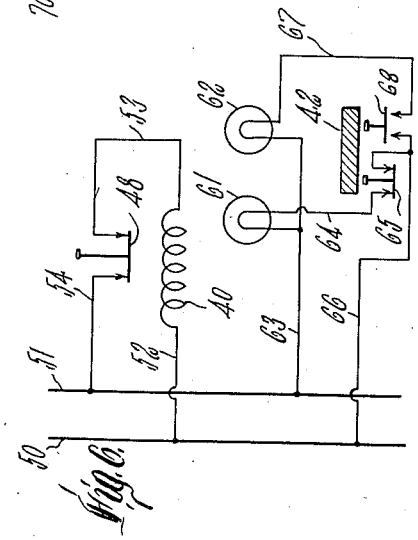
Inventor
Willis F. Moore Oct. 10, 1944.  W. F. MOORE  2,359,869
THREAD GAUGE
Filed Oct. 6, 1942  4 Sheets-Sheet 3
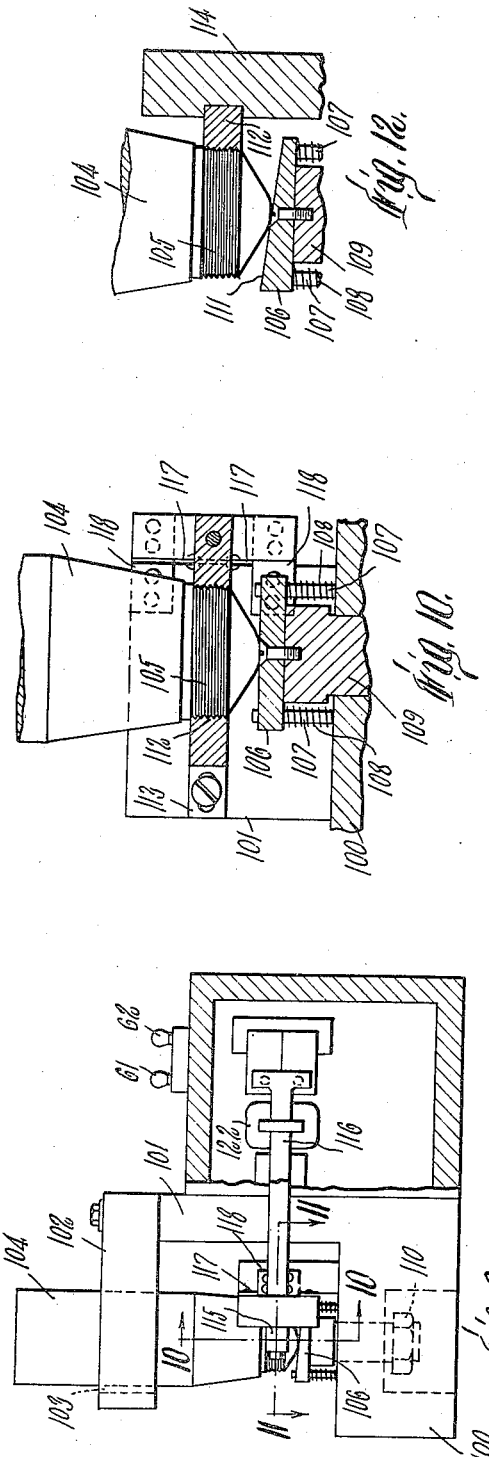
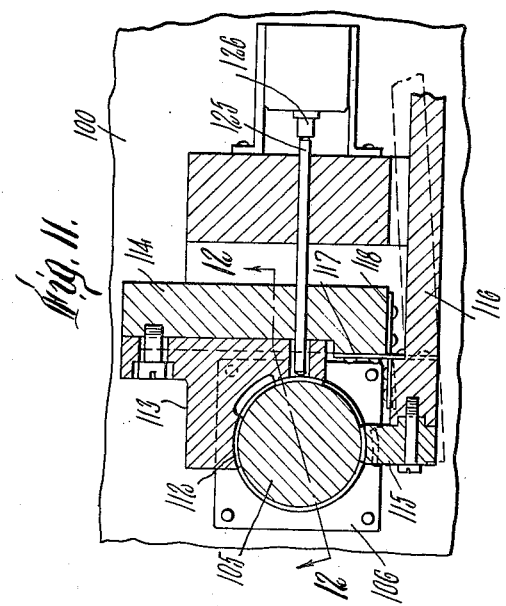
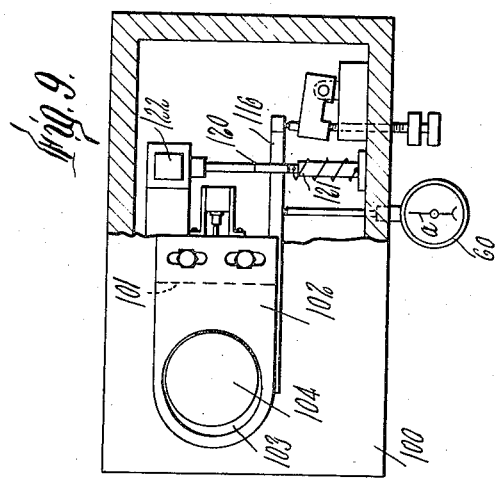
Inventor
Willis F. Moore
by Wright, Brown, Quinby & May
Attys.

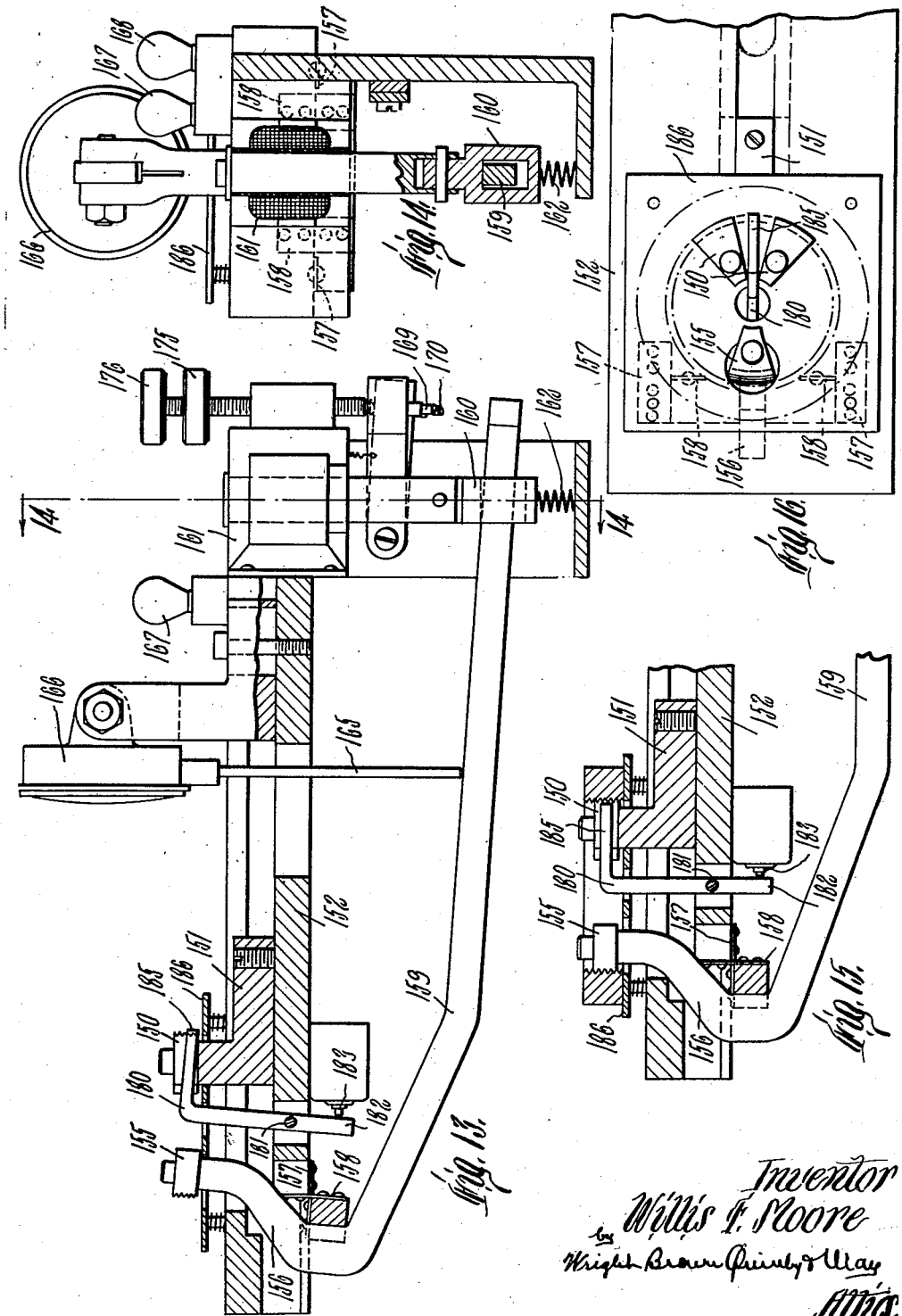

Patented Oct. 10, 1944

2,359,869

UNITED STATES PATENT OFFICE 2,359,869

THREAD GAUGE

Willis F. Moore, Springfield, Vt., assignor to Bryant Chucking Grinder Company, Springfield, Vt., a corporation of Vermont Application October 6, 1942, Serial No. 460,961

13 Claims. (Cl. 33—199)

This invention relates to work gauging, particularly of threaded work, though in the broader aspects not limited thereto, threaded work being a form of peripherally grooved work wherein one or more grooves are continuous helices throughout the length of the threaded portion, and has for an object to provide a gauge by which work pieces may be tested with great rapidity to determine whether or not they are within desired tolerance limits.

A further object is to provide a gauge by which a complete thread gauging action may be obtained by relative rotation between the work and gauge of one-half a complete turn.

Still another object is to provide a gauge in which the gauging elements have long effective life.

Another object is to provide a gauge normally open for the reception of work and automatically closed when work is placed in gauging relation thereto.

Further objects and advantages will appear from a description of certain embodiments of the invention shown in the accompanying drawings, in which Figure 1 is a view partly in front elevation, and partly broken away and in section, of an external thread gauge.

Figures 2 and 3 are detail sections on lines 2—2 and 3—3, respectively, of Figure 1.

Figure 4 is a fragmentary top plan view of the same.

Figure 5 is a sectional view on line 5—5 of Figure 1.

Figure 6 is a wiring diagram of the electrical system.

Figure 7 is a sectional detail to a larger scale of a gauging element.

Figure 8 is a view partly in elevation and partly in section showing a different form of external gauge.

Figure 9 is a view partly in top plan and partly broken away and in section of the gauge of Figure 8.

Figures 10 and 11 are detail sectional views on lines 10—10 and 11—11, respectively, of Figure 8.

Figure 12 is a detail sectional view on line 12—12 of Figure 11.

Figure 13 is a fragmentary view partly in elevation and partly in section showing an internal thread gauge, the gauge being shown in open condition.

Figure 14 is a sectional view on line 14—14 of Figure 13.

Figure 15 is a view similar to a portion of Figure 13, but showing the gauge in gauging position.

Figure 16 is a fragmentary top plan view of the gauge shown in Figures 13 to 15, inclusive.

Referring first to the apparatus illustrated in Figures 1 to 5, which illustrate a gauge for gauging external threads, at 1 is shown a suitable supporting stand upon the top of which is a supporting block 2, to the upper face of which is secured, as by screws 3, a work gauging member 4 provided with a pair of angularly spaced interrupted gauging thread element portions 5. The thread portions of the elements 5 are arranged to form portions of the same continuous threads, these threads being internal threads for mating engagement with the external threads of the work pieces to be gauged. To the upper face of the block 2 there is secured by pairs of leaf springs 10 and 11 a fulcrum block 12 of a gauging lever 13. The springs 10 are secured at opposite ends to upright faces 14 and 15 of the blocks 2 and 12, respectively, and the springs 11 are secured to top and bottom faces 16 and 17, respectively, of these same blocks, and their intersecting axes form the fulcrum about which the lever 13 is pivoted. The upper end of the lever 13 above the fulcrum at 20 carries a movable gauging element 21 having interrupted thread portions 22 forming continuations of the threads of the elements 5.

In the position shown in Figure 1 the lever 13 is rocked to an angular position in which the element 21 is out of gauging position, the gauge then being open and in condition for work to be gauged to be inserted therein. In order that such work may be readily placed in position, the member 4 is shown as having fixed to its upper end a guide piece 25 having convex ridges 27 of thread contour against which the thread valleys of the work to be gauged may be pressed, thus locating the work axially so that when it is moved downwardly below the guide block 25 its threads are guided into proper relation to mate with the threads of the elements 5.

Further to facilitate the entrance of the work, a spring finger 29, also presenting a thread face, is carried at the upper end of an inverted L-shaped arm 30 secured to a portion of the member 4 as by a screw 31. This spring 29 cooperates with the element 27 to aid in properly presenting the work between the fixed gauging elements 5 and the movable gauging element 21.

The springs 10 and 11 are so formed as to bias the movable gauging element 21 to be moved toward the fixed elements 5, so as when work is placed between them the movable element 21 will tend to engage the work in gauging relation thereto, but in order to facilitate the entrance and removal of work, means are provided by which the movable gauging element 21 is held out from its normal gauging position in the position shown in Figure 1. As shown this means comprises a yoke member 35, one end of which is slidable in a recess 36 in a guide bracket 37 secured to the stand 1. The other end portion of the yoke 35 is shown as the core of an electromagnet 40. The member 35 is provided with a slot 41 therethrough through which the lower end of the arm 42 of the lever 13 extends, and in the position of the parts shown in Figure 1 with the solenoid 40 energized, the edge 43 of the slot 41 engages the arm 42 and holds the arm 42 in the position shown with the movable gauging element 21 retracted. On de-energization of the solenoid 40, however, a spring 44 secured at one end to the yoke and at its other end to the bracket 37 retracts the yoke so that the lever 13 is free to swing under the biasing action of the springs 10 and 11 to bring the movable element 21 into contact with work placed between this movable element and the fixed elements 5.

Means are provided in accordance with this invention by which when work is positioned in gauging relation to the fixed elements 5, the solenoid 40 is automatically de-energized. For this purpose, a feeler rod 48 is slidably mounted through the top of the stand 1, block 2, and the member 4, its lower end engaging a normally closed switch at 49. In the closed position of this switch the upper end of the feeler 48 projects upwardly sufficiently to be contacted by the work which is placed in gauging relation to the elements 5, and is depressed sufficiently to open the normally closed switch 49 and de-energize the solenoid 40. In Figure 6 a wiring diagram shows this action, the power being taken from the lines 50 and 51, the circuit being made from line 50, through lead 52, solenoid 40, lead 53, normally closed switch 48, and lead 54 to the line 51.

As a work piece is placed in gauging relation to the gauge, the movable gauging element 21 is released to be swung by its biasing springs into gauging relation to the work and the position of this element 21 when in such gauging position is then shown on a suitable indicator. Such an indicator may be a well known position indicator such as shown diagrammatically at 60 having a stem 61 which may be contacted by the arm 42.

Another means for indicating comprises the two lamps 61 and 62 which receive their energy from the lines 50 and 51 as shown in Figure 6. Thus the lamp 61 receives energy from the line 51 through the leads 63, 64, and the normally closed switch 65, and through lead 66 to line 50. The lamp 62 may receive its energy through the lead 63, lamp 62, lead 67, normally open switch 68 and lead 66. The switches 65 and 68 may be arranged in casings 70 and 71, respectively, which are shown as hinged as at 72, and are normally held up against stop screws 73 and 74 as by suitable springs 75.

When the gauge is in open condition as shown in Figure 1, the normally closed switch 65 is closed so that the light 61 is lit. If, however, the element 21 when it moves into gauging relation to the work moves sufficiently far, the arm 42 engages the switch 65 and opens it so that the light 61 is extinguished. The point at which this light is extinguished is so adjusted as to represent the maximum size tolerance limit. If, and when the gauge element 21 moves inwardly entirely through the tolerance zone, it engages the switch 68 which it then closes and the lamp 62 lights, showing that the work is below the minimum tolerance size. During a gauging action, if the light 61 goes out and the light 62 fails to be lighted, it can be known that the work is within the tolerance limits.

In order that this gauging action may be a complete one, the length of the gauging elements in the direction of the axis of the work should be substantially equal to the length of the threaded portion being gaged, whereupon by turning the work relative to the gauge for not over a half turn, any high or low points of the thread, whether due to pitch diameter or lead error, or both, are contacted by one or the other of the gauging elements, so that if during this half turn neither of the lights 61 nor 62 lights, it is known that the work is within the desired tolerance limits. Where the gauge 60 is employed the deflection of the gauge needle $a$ as shown on Figure 4 must be within desired tolerance limits during the gauging action in order that the work may pass. If at any time the needle swings outside of these desired limits, the work should be rejected.

With the gauge as thus described, it will be seen that the gauging action for each piece of work may be exceedingly quickly accomplished, so that the gauge has a large testing capacity.

Further, in order to minimize wear on the gauging elements, the gauging surfaces which contact the work are preferably coated with a thin layer of tungsten carbide, this being indicated at 70 in Figure 7. This tungsten carbide may be applied to the surface of the gauging element by a spraying operation known in the art, which, however, forms no part of the present invention.

In the machine as thus described, it will be noted that the axis of the work to be gauged is arranged substantially horizontally during the gauging action. In some instances, however, it may be preferable to support the work with its thread axis vertical, particularly when the threaded portion of the work represents a small part thereof and the work is of cylindrical outline and rather heavy. Such a gauge and work is illustrated in Figures 8 to 11. Referring to these figures, the gauge support 100 is provided with an upstanding arm 101, to the upper end of which is secured a member 102 provided with an aperture 103 through which the work to be gauged at 104 may be inserted and somewhat loosely supported against tilting. The lower end of the work, which is shown as provided with the reduced diameter threaded portion 105 to be gauged, rests upon a spring pressed platform 106. This platform, as shown, is vertically slidable on guide posts 107 extending upwardly from the top face of the support 100, these posts being surrounded by coil springs 108. The platform is shown as secured to the upper end of a plunger 109, the lower end of which is threaded for the reception of a stop nut 110 which limits the extent of upward motion of the platform by action of the springs 108, and, preferably, the top face 111 of the platform is downwardly inclined so as to guide the lower end of the work toward the angularly spaced stationary gauging elements 112 carried by the gauge block 113. The spring support for this platform facilitates up or down adjustment of the work to bring its threads into mating relation to the thread portions of the fixed gauging element 112. This gauging block 113 is fixed to a stationary support 114 carried by the support 100 and cooperating with these stationary gauging elements 112 is the movable gauging element 115. This element 115 is carried by the lever 116, which is fulcrumed on pairs of leaf springs 117 and 118, which are arranged at right angles to each other similarly to the springs 10 and 11 of the construction shown in Figure 1. These springs 117 and 118 normally bias the movable gauging element 115 toward gauging position. The long arm of the lever 116 passes through the slotted yoke 120 slidably guided by the guide bracket 121 and forming the core for the solenoid 122, similar to the construction shown in Figure 1.

The position of the arm of the lever 116 during the gauging actuation may be determined by the indicator 60, or if desired, the visible indication as through the lamps 61 and 62 may be employed through the tolerance limit switches as in the construction of Figure 1. With this arrangement the feeler for actuating the normally closed switch to de-energize the solenoid 122 is mounted for horizontal motion, being shown at 125, one end being positioned to be engaged by the work and moved rearwardly to open the switch at 126, this switch corresponding to the switch 48 in the diagram of Figure 6.

This invention is also applicable to internal gauging, the gauge for this purpose being shown in Figures 13 to 16, inclusive. The fixed angularly spaced internal gauging elements 150 with their external thread gauging faces are carried by the stationary block 151 adjustably fixed to the support 152. The movable gauging element 155 is carried by the short arm of the lever 156 which is fulcrumed on the pairs of leaf springs 157 and 158. The long arm 159 of the lever 156 passes through the slot of the vertically movable yoke 160 which is normally held downwardly by the energization of the solenoid 161, but is lifted when the solenoid is de-energized, as by the spring 162, so that the movable gauging element 155 is then free to be moved into gauging relation to the work by the biasing action of its mounting springs 157 and 158. The arm 159 may operate the plunger 165 of the indicator 166 to give the gauging indicator, or if desired, "go" or "no go" signal lamps 167 and 168 may be employed, actuated by the switches 169 and 170 in the manner described in connection with the external gauge of Figures 1 to 6, the positions of these light controlling switch casings being adjustable, as by turning the adjusting screws 175 and 176 arranged similarly to the screws 73 and 74 of the construction of Figures 1 to 6.

With this arrangement the feeler which releases the movable gauging element for a gauging action is shown at 180 and comprises an angle-shaped lever fulcrumed at 181, its arm 182 being in controlling relation to the switch 183, which, when opened de-energizes the holding solenoid 161 and the horizontal arm 185 of which is contacted by the work. The work itself may be supported on a downwardly yielding spring supported platform 186 which permits the vertical adjustment of the work to a point where its threads may properly meet the threads of the fixed gauging members 150.

From the foregoing description of certain embodiments of this invention, it should be evident to those skilled in the art that various other changes and modifications might be made without departing from the spirit or scope of this invention.

I claim:

1. A gauge comprising a fixed work engaging element, a work engaging element movable relative to said fixed element into and out of engagement with work to be gauged placed in gauging contact with said fixed element, supporting means for said movable element including a spring biasing said movable element toward the work, electrical means when energized moving and holding said movable element out of work engaging position, a feeler positioned adjacent to said fixed element in position to be engaged and moved by work positioned in operative relation to said fixed gauging element, and a switch in the supply circuit of said electrical means and in operative relation to said feeler to be opened by such movement of said feeler to thereby de-energize said electrical means and permit said spring to move said movable gauging element into contact with the work.

2. A gauge comprising a lever, a work engaging element carried by one arm of said lever, a spring fulcrum for said lever biasing said lever in a direction to press said element against work to be gauged, a yoke engageable with another arm of said lever, means normally holding said yoke in a position to engage said other arm and hold said gauging element out of work engaging position, means actuable to release said holding means, and means engaging said yoke and moving said yoke to a position where it frees said other arm for motion to bring said movable element into engagement with work to be gauged when said yoke-holding means has been released.

3. A thread gauge comprising relatively movable threaded elements for engaging the threads of the work, one of said elements having positioned adjacent to its threads a guiding element having portions engaging the thread valleys of the work in position to guide the work into proper gauging relation to said one element.

4. A thread gauge comprising relatively movable threaded elements for engaging the threads of the work, each of at least two of said elements having positioned adjacent to its threads a guiding element having portions engaging the thread valleys of the work in position to guide the work into proper gauging relation to said elements, the guide portion of one of said gauging elements being rigid and the guide portion of another of said gauging elements being yieldable.

5. A thread gauge comprising relatively movable threaded elements for engaging the threads of the work, one of said elements having positioned adjacent to its threads a guiding element having yieldable portions engaging the threads of the work in position to guide the work into proper gauging relation to said one element.

6. A threaded gauge having a plurality of thread gauging elements provided with interrupted threads for engaging the threads of work arranged with the axis of the threaded portion extended upwardly, and a spring supported platform for supporting the work yieldingly to facilitate mating of the threads of the work with the threads of said elements, said platform having a downwardly inclined work supporting face leading toward at least one of said gauging elements.

7. A thread gauge having a plurality of thread gauging elements provided with interrupted threads for engaging the threads of work arranged with the axis of the threaded portion extended upwardly, a spring supported platform for supporting the work yieldingly to facilitate mating of the threads of the work with the threads of said elements, and a support for the work positioned above said gauging elements.

8. A thread gauge having a plurality of thread gauging elements provided with interrupted threads for engaging the threads of work arranged with the axis of the threaded portion extended upwardly, and a spring supported platform for supporting the work yieldingly to facilitate mating of the threads of the work with the threads of said elements, said platform having a downwardly inclined work supporting face leading toward at least one of said gauging elements, and a support for the work positioned above said gauging elements.

9. A gauge for peripherally grooved work comprising relatively movable gauging anvils having elements for engaging in a groove of the work, one of said anvils having positioned adjacent to its groove-engaging element a guide element having a portion engaging in the work groove in position to guide the work into proper gauging relation to said one anvil.

10. A gauge for peripherally grooved work comprising relatively movable gauging anvils having elements for engaging in a groove in the work, each of said anvils having positioned adjacent to its groove engaging element a portion engaging the work groove in position to guide the work into proper gauging relation to each of said gauging anvils, the guide portion of one of said anvils being rigid and the guide portion of another of said anvils being yieldable.

11. A gauge for peripherally grooved work, comprising a plurality of gauging anvils having elements for engagement within the groove of work arranged with its axis extending upwardly, and a spring supported platform for supporting the work yieldingly to facilitate mating the work groove with said element, said support having a downwardly inclined work supporting surface leading toward at least one of said anvils.

12. A gauge for peripherally grooved work, comprising a plurality of gauging anvils having elements for engagement within the groove of work arranged with its axis extending upwardly, a spring supported platform for supporting the work yieldingly to facilitate mating the work groove with said element, and a support for the work positioned above said anvils.

13. A gauge for peripherally grooved work, comprising a plurality of gauging anvils having elements for engagement within the groove of work arranged with its axis extending upwardly, a spring supported platform for supporting the work yieldingly to facilitate mating the work groove with said element, said support having a downwardly inclined work supporting surface leading toward at least one of said anvils, and a support for the work positioned above said anvils.

WILLIS F. MOORE.